(12) United States Patent
Luciani et al.

(10) Patent No.: US 8,423,792 B2
(45) Date of Patent: Apr. 16, 2013

(54) APPARATUS, SYSTEM, AND METHOD FOR COMMUNICATION BETWEEN A DRIVER AND AN ENCRYPTION SOURCE

(75) Inventors: David Luciani, Tucson, AZ (US); Raymond Anthony James, Lakeside, AZ (US)

(73) Assignee: International Business Machines Corporation, Armonk, NY (US)

( * ) Notice: Subject to any disclaimer, the term of this patent is extended or adjusted under 35 U.S.C. 154(b) by 1350 days.

(21) Appl. No.: 12/134,028

(22) Filed: Jun. 5, 2008

(65) Prior Publication Data
US 2009/0307501 A1 Dec. 10, 2009

(51) Int. Cl.
*G06F 11/00* (2006.01)
*G06F 11/30* (2006.01)

(52) U.S. Cl.
USPC .......................................... 713/192

(58) Field of Classification Search .................. 713/192
See application file for complete search history.

(56) References Cited

U.S. PATENT DOCUMENTS

| | | | | |
|---|---|---|---|---|
| 5,835,578 | A * | 11/1998 | Reyes et al. | 379/93.29 |
| 5,974,463 | A * | 10/1999 | Warrier et al. | 709/225 |
| 6,249,866 | B1 * | 6/2001 | Brundrett et al. | 713/165 |
| 7,882,354 | B2 * | 2/2011 | Greco et al. | 713/165 |
| 8,086,670 | B1 * | 12/2011 | Zink et al. | 709/203 |
| 8,122,261 | B2 * | 2/2012 | Sakamura et al. | 713/193 |
| 2008/0065898 | A1 * | 3/2008 | Greco et al. | 713/185 |

* cited by examiner

Primary Examiner — William Powers
(74) Attorney, Agent, or Firm — Kunzler Law Group, PC (57) ABSTRACT

An apparatus, system, and method are disclosed for interfacing a driver with an encryption source that uses a communication module that allows the driver and the encryption source to communicate messages to one another, wherein the messages result in the encryption source providing encryption data that the communication module relays to the driver.

10 Claims, 7 Drawing Sheets

APPARATUS, SYSTEM, AND METHOD FOR COMMUNICATION BETWEEN A DRIVER AND AN ENCRYPTION SOURCE

BACKGROUND OF THE INVENTION

1. Field of the Invention

This invention relates to encryption of data and more particularly relates to communication between an encryption source and a driver.

2. Description of the Related Art

Ever increasing concerns about the security of electronic data heighten the demand for systems for storing electronic data that provide encryption services. Electronic storage systems are often called upon to store vast amounts of electronic data. To be able to store such large amounts of electronic data, such systems rely on a variety of components, some of which, however, can generate problems when it comes to encrypting the electronic data which they help to store.

Currently available systems for storing large amounts of electronic data rely on automated tape libraries. In turn, these automated tape libraries, such as the International Business Machines (IBM) 3494 Automated Tape Library, rely on a series of drivers to communicate with devices in the system, such as tape drives. However, many of these drivers can be considered legacy equipment in that the parameters of their past design leave limitations that inhibit new functionalities, such as the ability to provide encryption services.

The drivers of many automated tape systems, like the IBM 3494 Automated Tape Library, pass and receive messages that are incompatible with encryption sources, making encryption of the electronic data stored by the system difficult. For example, many drivers have severe limitations on the size of information units they can pass and receive. Many drivers provide 16 bit data as opposed to 32 bit data. Additionally, many drivers communicate through a serial port, not in Transmission Control Protocol/Internet Protocol (TCP/IP). These obstacles prevent encryption.

To enable encryption, certain solutions replace legacy drives with drives that pass information through a fiber connection. Such solutions then rely on a hydra or a control unit to communicate with the encryption source. The fiber connection resolves any problems with the size of information passed, and the control unit or hydra may overcome any additional barriers. However, the replacement of legacy equipment is expensive, can cause further compatibility problems, and, in some instances, may result in totally new systems.

Other solutions encrypt electronic data before storing the data in an automated tape library. However, such approaches require each source of submission to have its own encryption capability and use its own processing resources to perform encryption. Where there are multiple sources of electronic data, the compatibility of the encryption capabilities from those sources may create an additional issue.

Therefore, from the foregoing discussion, it should be apparent that a need exists for an apparatus, system, and method that can bridge the gap between legacy drivers and encryption sources to allow automated tape libraries to store and encrypt electronic data.

SUMMARY OF THE INVENTION

From the foregoing discussion, it should be apparent that a need exists for an apparatus, system, and method that can bridge the gap between drivers and encryption sources. Beneficially, such an apparatus, system, and method would overcome limitations of legacy drivers in terms of the size of information they can pass receive, the 16 bit data they provide, and the serial format of that data. Additionally, such an apparatus, system, and method beneficially could correct errors.

The present invention has been developed in response to the present state of the art, and in particular, in response to the problems and needs in the art that have not yet been fully solved by currently available systems for combining encryption and storage services. Accordingly, the present invention has been developed to provide an apparatus, system, and method for combining encryption and storage services that overcome many or all of the above-discussed shortcomings in the art.

The apparatus is configured to provide an interface between a driver and an encryption source and includes a plurality of modules configured to functionally execute the necessary steps of passing a series of messages between the driver and the encryption source necessary for the encryption source to provide the driver with encryption data. These modules in the described embodiments include an encryption module and a communication module.

The apparatus, in one embodiment, is configured to pass the series of messages by combining buffered data sent from a particular driver into a driver message that the communication module relays to the encryption module and by packaging buffered data sent from the encryption module into one or more units, each unit of the one or more units being no larger than the maximum size that the particular driver can receive. The communication module passes the group of units, together making an encryption message, to the particular driver. In such an embodiment, the apparatus includes a buffer module, a driver message module, and an encryption module.

The apparatus is further configured, in one embodiment, to translate serial data from the at least one driver to communicate the data in Transmission Control Protocol/Internet Protocol (TCP/IP) and to translate from TCP/IP to communicate serially. Additionally, the apparatus may be configured to translate from 16 bit data to 32 bit data and vice versa. Such embodiments include a TCP/IP module, a serial translation module, and a bit conversion module.

In a further embodiment, the apparatus may be configured to provide a wrapper for data sent from the particular driver or a unit of data from data sent by the encryption module. The wrapper provides information about the destination of the data or unit of data and the message to which it pertains. Additionally, the apparatus may be configured to correct errors that arise during communication between the at least one driver and the encryption module. Such embodiments include a wrapper module and an error correction module.

A system of the present invention is also presented to interface an automated tape library with an encryption module. The system may be embodied with an automated tape library used to store electronic data, a plurality of drivers attached to devices in the automated tape library, an encryption module that provides encryption data to encrypt the electronic data stored by the automated tape library, and a communication module that allows the plurality of drivers to communicate with the encryption module by combining data from an individual driver in the plurality of drivers into a single message to the encryption module and by combining a single message to the individual driver into a group of units that are combined by the individual driver to recover the single message to the individual driver, wherein each unit is no larger than the maximum size that the individual driver can receive. In certain embodiments, the system includes a TCP/

IP module, a serial translation module, a bit conversion module, a wrapper module, and an error correction module.

A method of the present invention is also presented for communicating between an encryption source and a driver. The method in the disclosed embodiments substantially includes the steps necessary to carry out the functions presented above with respect to the operation of the described apparatus and system. In one embodiment, the method includes combining buffered serial data from a driver into a driver message, relaying the driver message to an encryption module, combining an encryption message from the encryption module into a group of units, with each unit no larger than the maximum size that the driver can receive, relaying the units to the driver, combining the units in the driver into the encryption message; and repeating the forgoing steps until the encryption message comprises an encryption key.

The method may also include translating the serial data of the driver message for communication in TCP/IP, removing TCP/IP formatting to communicate the encryption message serially to the driver, surrounding the serial data and each unit in the group of units in a wrapper that provides information about a particular message to which the units and the data belong and the destination of the particular message. The method may further include converting 16 bit serial data from the driver to 32 bit data, converting 32 bit data from the encryption message to 16 bit data, and addressing errors that occur in the communications between the encryption module and the driver.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
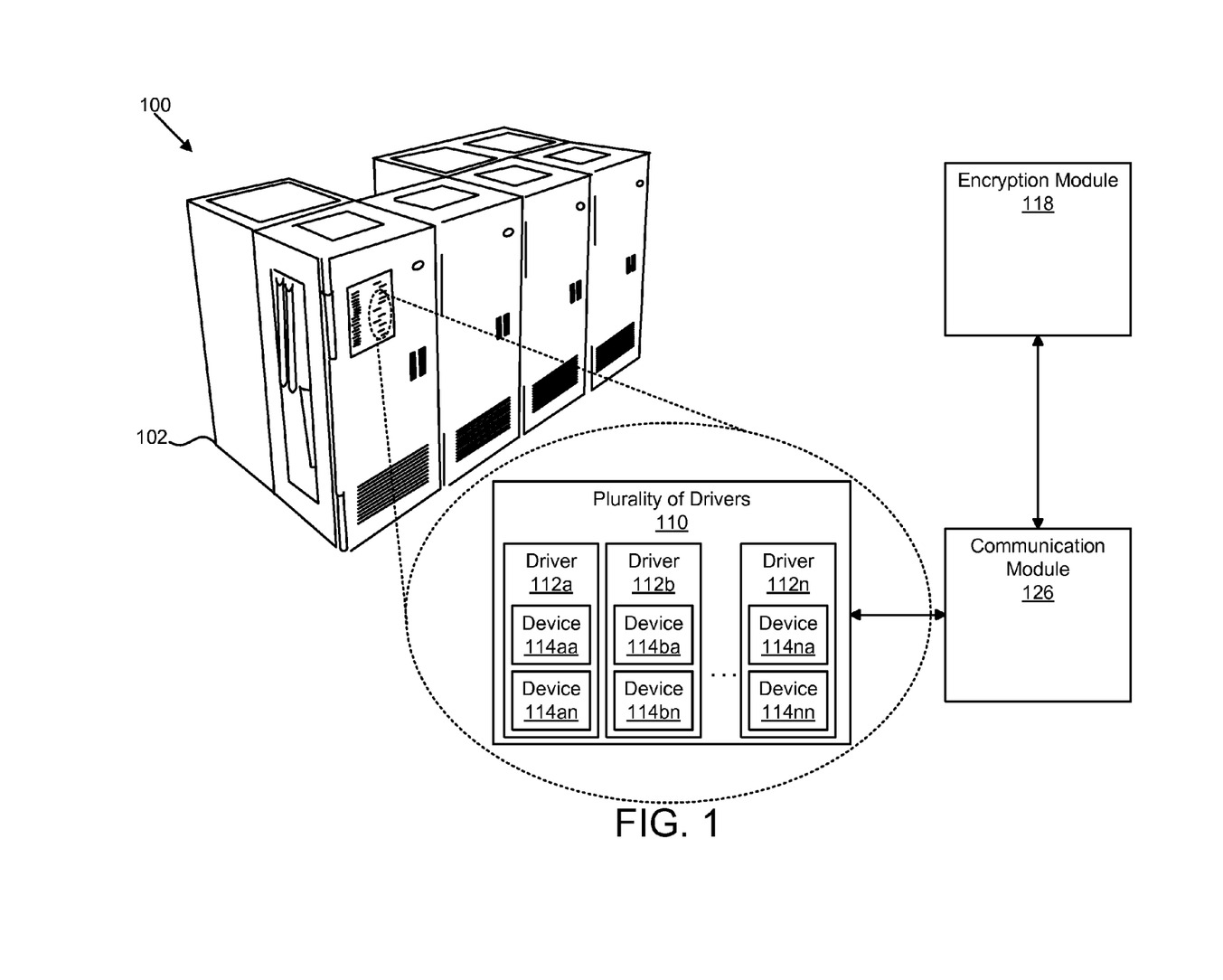
FIG. 1 is a schematic block diagram illustrating one embodiment of a system configured to interface an automated tape library with an encryption module in accordance with the present invention.

FIG. 1 depicts a system 100 configured to interface an automated tape library with an encryption module in accordance with the present invention. The system includes an automated tape library 102, a plurality of drivers 110, an encryption module 118, and a communication module 126. The plurality of drivers 110 includes a series of drivers 112a-112n with each driver controlling multiple devices 114aa-114nn in the automated tape library. The various components of the system 100 cooperate to provide encryptions services for the electronic data (not shown) stored in the automated tape library 102.

The automated tape library 102 stores large amounts of electronic data on magnetic tape (see FIG. 2 below) for archival purposes. One example of an automated tape library 102 is the IBM 3494 Automated Tape Library. To perform its storage function, the automated tape library 102 contains a number of hardware devices 114aa-114nn, such as tape drives (see FIG. 2 below) that read and write the electronic data. The automated tape library 102 controls the devices 114aa-114nn, and the reading and writing that certain of those devices 114x-114y perform, with a plurality of drivers 110.

The plurality of drivers 110 comprises a series of drivers 112a-112n, wherein each driver 112n controls multiple devices 114na-114nn. The automated tape library 102 uses the series of drivers 112a-112n to control the devices 114aa-114nn to store electronic data. Additionally, the series of drivers 112a-112n control the devices 114aa-114nn to encrypt the electronic data and, in certain embodiments, to decrypt the data.

To encrypt or decrypt the data, however, the series of drivers 112a-112n in the plurality of drivers 110 require encryption data (not shown) from the encryption module 118. In certain embodiments, the encryption data is in the form of an encryption key, and the encryption module 118 is an encryption key manager. In certain embodiments, the encryption module 118 includes a plurality of encryption key managers. In many embodiments, before the encryption data, or encryption key, can be communicated to a particular driver 112n, a series of messages (not shown) must be exchanged by the particular driver 112n and the encryption module 118.

The series of messages includes a request from the particular driver 112n for encryption data. In response to the request message (not shown), in certain embodiments, the encryption module 118 sends an inquiry for further information that makes up an inquiry message (not shown). The particular driver, in turn, responds to the inquiry message with a reply message (not shown) that provides the needed information. The inquiry and reply messages continue until the encryption module 118 has sufficient information to provide the encryption data, which it then sends.

However, the series of drivers 112a-112n in the plurality of drivers 110 comprise legacy equipment in terms of the limitations of the series of drivers 112a-112n to communicate information. For example, at least one driver 112n in the series of drivers 112a-112n is incapable of communicating the full size messages required to communicate with the encryption module 118 and of receiving full size messages because of a maximum size of information that that the driver 112n can relay and receive. In certain embodiments, the maximum size is a function of the number of devices 114na-114nn that a particular driver 112n can control.

To overcome the communication limitations of the legacy equipment, in terms of the series of drivers 112a-112n, the system 100 includes a communication module 126. The communication module 126 combines data (not shown) from an individual driver 112n in the plurality of drivers 110 into a driver message (not shown). The communication module 126 then passes the driver message to the encryption module 118.

Also, the communication module 126 combines an encryption message (not shown) from the encryption module 118 to the individual driver 112n into a group of units (not shown). Each unit (not shown) of the group of units is no larger than the maximum size that the individual driver 112n can receive. The communication module 126 relays the group of units to the individual driver 112n, and the individual driver 112n combines the group of units to receive the encryption message.

In additional embodiments, the communication module 126 includes a TCP/IP module, a serial translation module, a bit conversion module, a wrapper module, and an error correction module. These additional modules perform additional functions that may be necessary for the plurality of drivers 110 and the encryption module 118 to communicate with one another efficiently. These modules will be discussed in more detail below with reference to the following figures.

Figure 2:
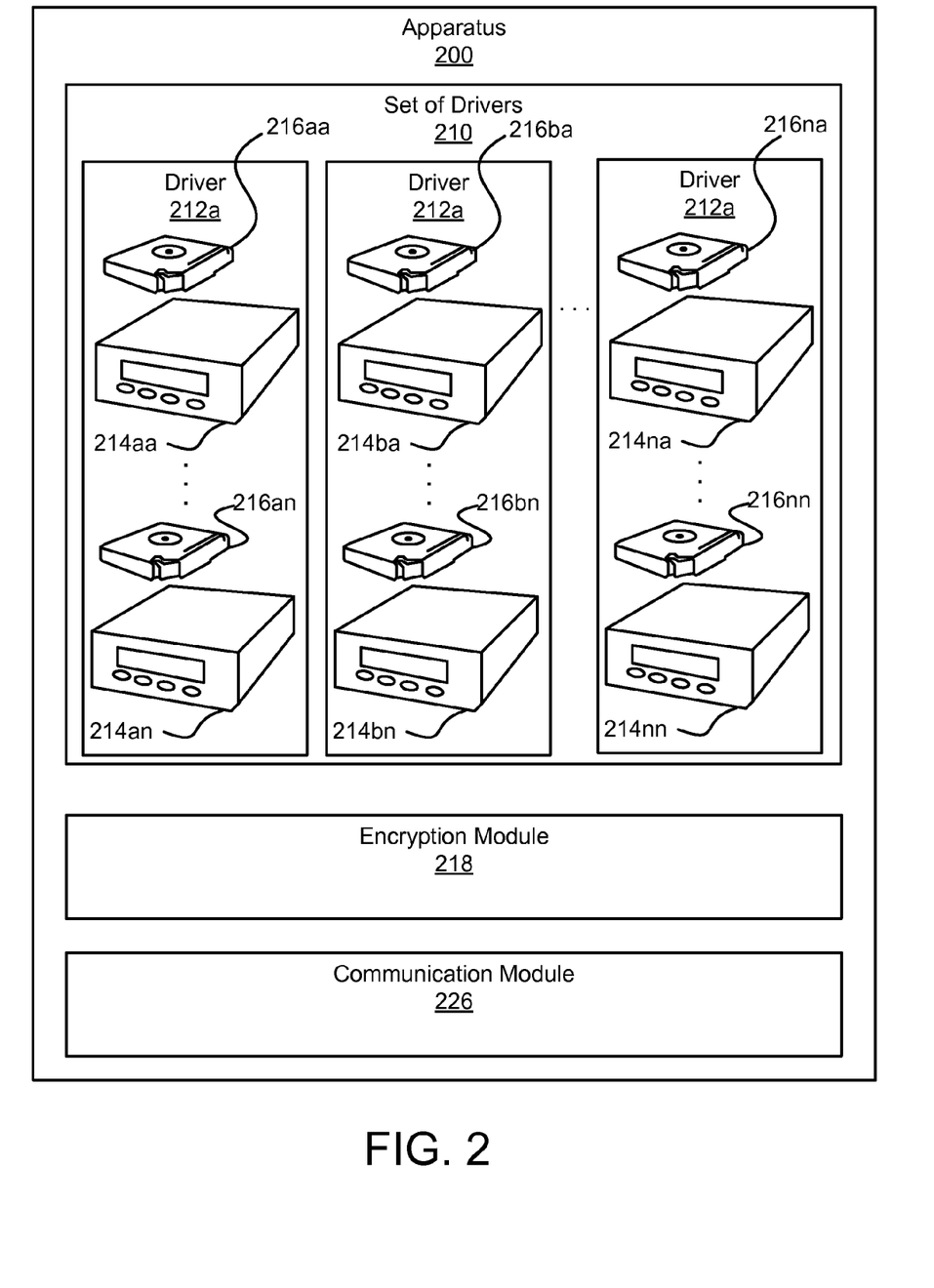
FIG. 2 is a schematic block diagram of an apparatus configured to interface a driver with an encryption module.

FIG. 2 depicts an apparatus 200 configured to interface a driver with an encryption module. The apparatus 200 includes a set of drivers 210, an encryption module 218, and a communication module 226. The set of drivers 210 includes a series of drivers 212a-212n with each driver providing an interface for multiple devices 214aa-214nn used to read and/or write magnetic tapes 216aa-216nn. The various components of the apparatus 200 cooperate to provide an interface between the set of drivers 210 and the encryption module 218 that allows for encryption of the electronic data (not shown) stored, or to be stored on, the magnetic tapes 216aa-216nn.

In certain embodiments, the set of drivers 210 is a set of one including a single driver 212a. In other embodiments, the set of drivers includes multiple drivers 212a-212n. The drivers 212a-212n control the devices 214aa-214nn. In certain embodiments, each driver 212n controls multiple devices 214na-214nn. The devices 214aa-214nn are tape drives capable of reading and/or writing on magnetic tapes 216aa-216nn.

In certain embodiments, an individual driver 212n controls each device 214na-214nn over which it has control to read electronic data (not shown) on a particular magnetic tape 216nn and to write that electronic data in encrypted form back onto the particular magnetic tape 216nn, or on other magnetic tapes 216na-216nk. In other embodiments, the individual driver 212n controls a particular device 214nn to originally write electronic data on a particular magnetic tape 216nn. In certain embodiments, the individual driver 212n controls the particular device 214nn to read encrypted electronic data on the particular magnetic tape 216nn.

To read and write encrypted data, the individual driver 212n relies on encryption data (not shown) provided by the encryption module 218. In certain embodiments, the encryption data is in the form of an encryption key, and the encryption module 218 is an encryption key manager. To acquire the encryption data, in certain embodiments, the individual driver 212n and the encryption module must exchange a series of messages (not shown) substantially similar to those discussed above with respect to FIG. 1.

However, limitations on the ability of at least one driver 212n in the set of drivers 210 to pass information require a communication module 226. The communication module 226 allows messages between drivers 212a-212n and the encryption module 218 to be passed, in addition to encryption data, seamlessly. In various embodiments, the communications module 226 includes various additional modules necessary to overcome limitations in the drivers 212a-212n and to correct any problems that may arise in the communication process. These modules are discussed in more detail below with respect to FIG. 3.

Figure 3:
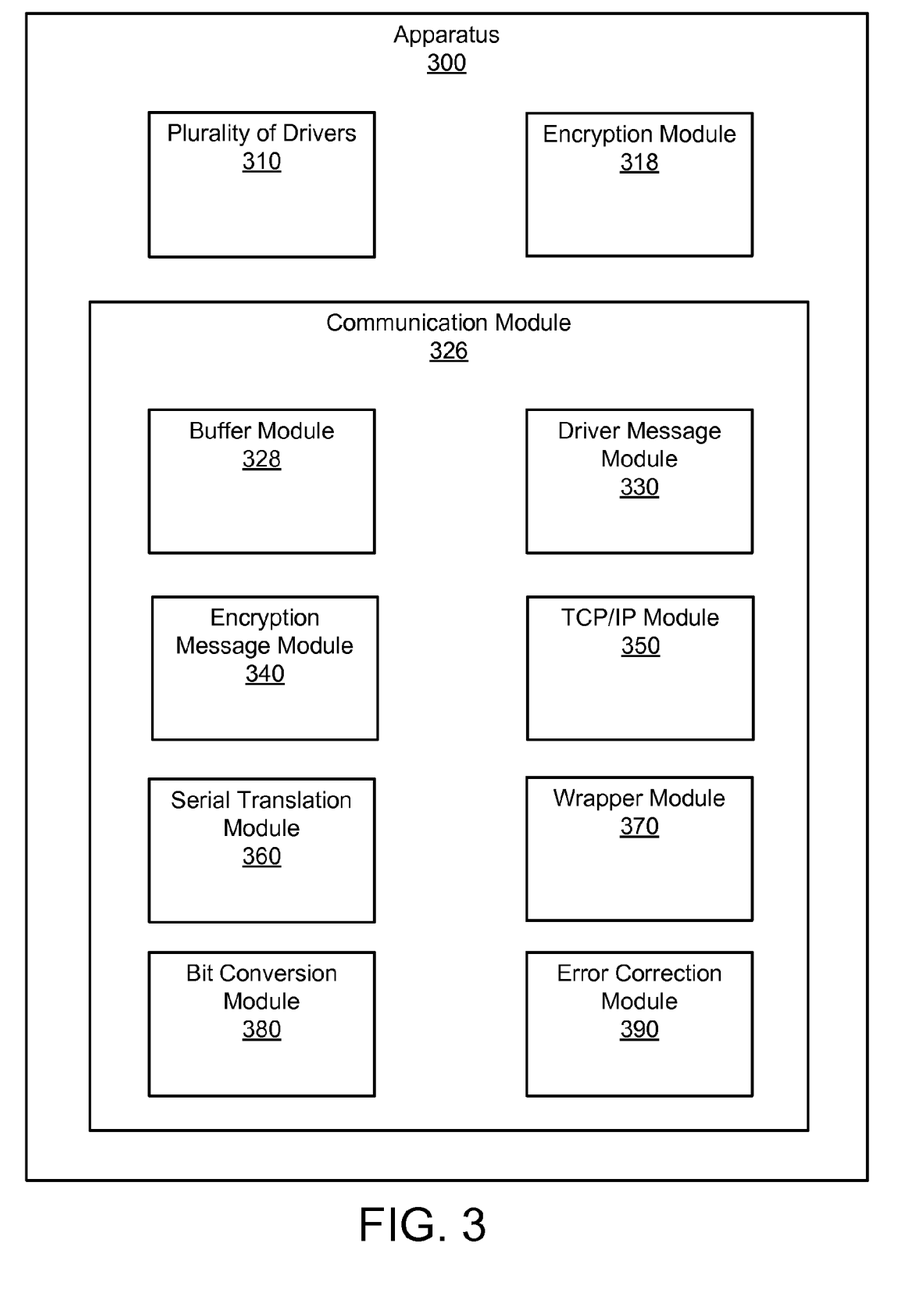
FIG. 3 is a schematic block diagram of an apparatus configured to interface a driver with an encryption module with additional modules to perform functions of translation and error correction.

FIG. 3 depicts an apparatus 300 configured to interface a driver with an encryption module with additional modules to perform functions of translation and error correction. The apparatus includes 300 includes a set of drivers 310, an encryption module 318, and a communication module 326, substantially similar to the set of drivers 210, the encryption module 218, and the communication module 226 appearing in FIG. 2. Additionally, however, the communication module 326 of the apparatus 300 includes a buffer module 328, a driver message module 330, an encryption message module 340, a TCP/IP module 350, a serial translation module 360, a wrapper module 370, a bit conversion module 380, and an error correction module 390. The various components of the apparatus 300 cooperate to allow the set of drivers 310 and the encryption module 318 to seamlessly pass messages to one another, including encryption data.

The communication module 326 includes a buffer module 328 that buffers data (not shown) sent from an individual drive 212n in the set of drivers 310. The buffer module also buffers data (not shown) sent from the encryption module 318. The communication module 326 also includes a driver message module 330 that takes data sent from an individual drive 212n and buffered by the buffer module 328 and combines the buffered data into driver messages (not shown) from the driver for delivery by the communication module 326 to the encryption module 318.

Additionally, the communication module 326 includes an encryption message module 340. The encryption message module 340 takes data sent from the encryption module 118 in the form of an encryption message (not shown) and buffered by the buffering module 328 and packages that data in a group of units (not shown) of data. Each unit of data (not shown) is no larger than the maximum size that the individual drive 212n can receive. The communication module 326 then relays the group of units to the individual driver 212n. The individual driver 212n then combines the group of units to form the original encryption message.

In certain embodiments, the communication module 326 also includes a TCP/IP module 350 and a serial translation module 360. The TCP/IP module 350 takes the serial format of a driver message (not shown) and provides additional formatting to make the driver message communicable in the TCP/IP understood by the encryption module 318. The serial translation module also removes TCP/IP formatting from an encryption message so that the encryption message can be communicated serially to a serial port of an individual driver 212n in the plurality of drivers.

In additional embodiments, the communication module 326 includes a wrapper module 370. The wrapper module 370 provides information about the final destination of data from the set of drivers 310 and from the encryption module 318, together with information about the message to which the data pertains. In certain embodiments, the wrapper module 370 encapsulates the one or more units created from the data from the encryption module 318 in a first set of wrappers (not shown) that provide destination and message identification information (not shown) about a plurality of encryption messages (not shown) to which the units belong and the destination of that plurality of encryption messages.

Additionally, in such an embodiment, the wrapper module 370 encapsulates the data from the set of drivers 310 in a second set of wrappers (not shown) that provide destination and message identification information (not shown) about a plurality of driver messages to which the data belong and the destination of that plurality of driver messages. In certain embodiments, an individual driver 212n of the set of drivers 310 uses message identification information in certain wrappers of the first set of wrappers to create a complete encryption message from the one or more units of information it receives.

Furthermore, the communication module 326 includes a bit conversion module 380. The bit conversion module 380 makes a conversion from 16 bit data to 32 bit data and from 32 bit data to 16 bit data. In certain embodiments, the bit conversion module 380 makes the conversion from 16 bit data to 32 bit data when sending messages from the set of drivers 310 to the encryption module 318. Additionally, in certain embodiments, the bit conversion module 318 makes the conversion from 32 bit data to 16 bit data when sending messages from the encryption module 318 to the set of drivers 310.

According to the embodiment of apparatus 300, the communication module 326 includes an error correction module 390. The error correction module 390 corrects errors that arise during communication between the set of drivers 310 and the encryption module 318. For example, in certain embodiments, the error correction module 390 reviews each driver message (not shown) and each encryption message (not shown) for certain requirements. The error correction module 390 returns driver messages that do not satisfy requirements back to the individual driver 212n in the set of drivers 310 that originated the driver message. Similarly, the error correction module 390 returns encryption messages that do not satisfy requirements back to the encryption module 318. Additional standard forms of error correction will be readily apparent to those of ordinary skill in the art in light of this disclosure.

Figure 4:
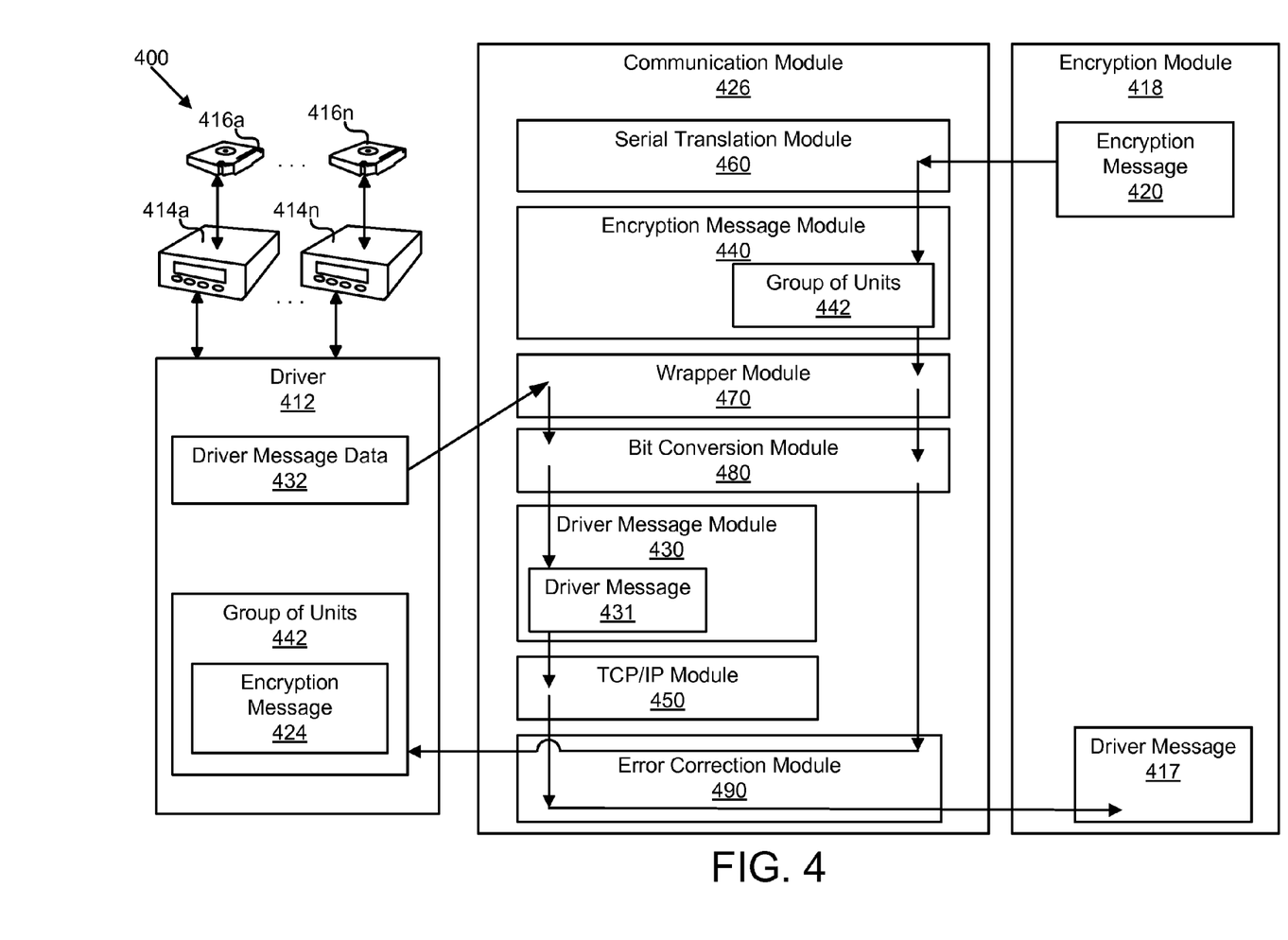
FIG. 4 is a schematic block diagram illustrating an apparatus configured to deliver messages between a driver and an encryption source in accordance with one embodiment of the present invention.

FIG. 4 is a schematic block diagram illustrating an apparatus 400 configured to deliver messages between a driver and an encryption source in accordance with one embodiment of the present invention. The apparatus 400 includes a driver 412, multiple devices 414a-414n, multiple magnetic tapes 416a-416n, an encryption module 418, and a communication module 426. The communication module 426 includes a driver message module 430, an encryption message module 440, a TCP/IP module 450, a serial translation module 460, a wrapper module 470, a bit conversion module 480, and an error correction module 490 substantially similar to modules of the same name discussed above with respect to FIG. 3.

Additionally, the driver 412 includes driver demand message data 432a and, at a latter point in time, at least one set of driver reply message data 432n. The encryption module 418 includes first encryption inquiry message data 420a and, at latter points in time, at least one set of additional encryption inquiry message data 420b, and encryption key message data 420n. The various components of the apparatus 400 cooperate to deliver messages 432a-432n, 420a-420n between the driver 412 and the encryption module 418.

The driver 412 sends driver demand message data 432a to the wrapper module 470 in the communication module 426. The wrapper module 470 encapsulates the driver demand message data 432a in a first set of wrappers (not shown) that indicate the driver message 431 to which they belong and the destination of that driver message 431. The driver message 431 may include driver demand message data 432a or driver reply message data 432n. In certain embodiments, the wrapper module 470 then passes the first set of wrappers to a bit conversion module 480. In other embodiments, the communication module 426 passes the first set of wrappers to the bit conversion module 480.

The bit conversion module 480 takes 16 bit data encapsulated by each wrapper in the first set of wrappers and converts it to 32 bit data. Either the bit conversion module 480 or the communication module 426 passes the first set of wrappers to the driver message module 430. The driver module 430 of apparatus 400 performs a function substantially similar to the buffer module 328 of FIG. 3 and buffers the first set of wrappers. Additionally, the driver message module 430 combines wrappers from the first set of wrappers to create a complete driver message 431 based on message identification information in those wrappers.

Either the driver message module 430 or the communication module 426 passes the driver message 431 to the TCP/IP module 450. The TCP/IP module 450 removes the wrappers from the data comprising the driver message 431 and adds additional formatting to the driver message so that the driver message 431 can be communicated in TCP/IP, including destination information, originally in the wrappers removed by the TCP/IP module 450. Either the TCP/IP module 450 or the communication module 426 passes the driver message 431 to the error correction module 490. The error correction module 490 reviews the driver message 431 for errors (not shown) and takes measures to correct any errors. Either the error correction module 490 or the communication module 426 passes the driver message 431 to the encryption module 418, which receives the driver message 431.

Similarly, the encryption module 418 passes first encryption inquiry message data 420a to a serial translation module 460 in the communication module 426. The serial translation module 460 removes TCP/IP formatting from the first encryption inquiry message data 420a so that the first encryption inquiry message data 420a can be transmitted serially. In certain embodiments, the serial translation module 460 passes the serially formatted first encryption inquiry message data 420a to the encryption message module 440. In other embodiments, the communication module 426 passes the first encryption inquiry message data 420a to the encryption message module 440.

The encryption message module 440 performs a function similar to the buffer module 328 described above with relation to FIG. 3 by buffering the first encryption inquiry message data 420a. Additionally, the encryption message module 440 packages the first encryption inquiry message data 420 into a group of units 442. The group of units 442 may include first encryption inquiry message data 420a, additional encryption inquiry message data 420b, and encryption key message data 420n. The size of each unit in the group of units 442 is determined by the maximum size of information that the driver 412 can receive, for example 1K. Either the encryption message module 440 or the communication module 426 then passes the group of units 442 to the wrapper module 470.

The wrapper module 470 encapsulates each unit in the group of units 442 with a wrapper (not shown), resulting in a second set of wrappers (not shown). Each wrapper provides information identifying the first message inquiry data 420a as its source. Additionally, each wrapper includes information indicating the driver 412 as the ultimate destination of the unit. In embodiments with multiple drivers 412a-412n, the wrapper identifies a particular driver 412n as the ultimate destination. Either the wrapper module 470 or the communication module 426 passes the group of units 442 to the bit conversion module 480.

The bit conversion module 480 converts the 32 bit data from the first encryption inquiry message data 420a to 16 bit data. Either the bit conversion module 480 or the communication module 426 passes the group of units 442 to the error correction module 490. The error correction module 490 reviews the group of units 442 for errors (not shown) and takes measures to correct any errors.

Either the error correction module 490 or the communication module 426 passes the group of units 442 to the driver 412, which receives the group of units 442. The driver then removes the wrapper from each unit in the group of units 442 and combines the units to generate the complete encryption message 424. The complete encryption message 424 may include first encryption inquiry message data 420a, additional encryption inquiry message data 420b, and encryption key message data 420n.

The driver 412 sends the driver demand message data 432a to the communication module 426 for embodiment in a driver message 431, which the communication module 426 sends to the encryption module 418. The encryption module 418, in certain embodiments, then sends first encryption inquiry message data 420a to the communication module 426 for packaging into a group of units 442 that is unpackaged by the driver 412 as an encryption message 424. In certain embodiments, the driver responds with driver reply message data 432n, which it sends to the communication module 426 for embodiment in a driver message 431, which the communication module sends to the encryption module 418. In response, the encryption module 418 sends additional encryption inquiry message data 420b for packaging into a group of units 442 by the communication module 426, which again are combined by the driver 412 into an encryption message 424.

Depending on the embodiment, this process of sending driver reply message data 432n and additional encryption inquiry message data 420b can repeat itself any number of times. However, once the encryption module 418 has sufficient information, the encryption module 418 sends encryption key message data 420n to the communication module 426. The communication module 426 packages the encryption key message data 420n in a group of units 442 that are combined by the driver 412 into an encryption message 424 that comprises, in certain embodiments, an encryption key.

The driver 412 uses the encryption message 424 comprising, in certain embodiments, an encryption key to control multiple drivers 414a-414n, comprising, in certain embodiments, tape drives, to write electronic data (not shown) on multiple magnetic tapes 416a-416n in encrypted form. In certain embodiments, the driver 412 uses the encryption message 424 to decrypt electronic data stored on the multiple magnetic tapes 416a-416n.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
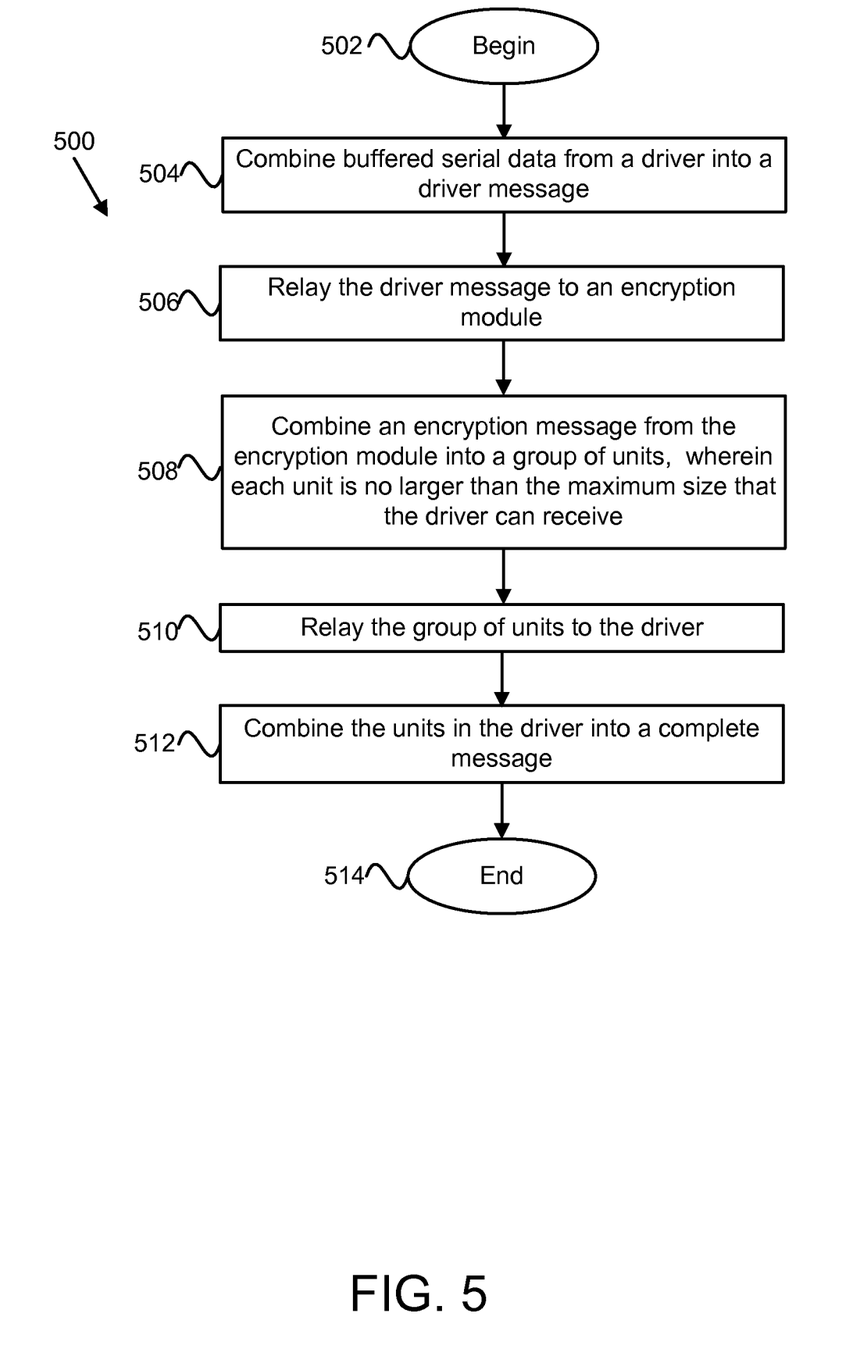
FIG. 5 is a schematic flow chart diagram illustrating one embodiment of a method for communicating between an encryption module and a driver in accordance with the present invention.

FIG. 5 is a schematic flow chart diagram illustrating one embodiment of a method 500 for communicating between an encryption module and a driver in accordance with the present invention. The method begins 502 and a communication module 226 combines 504 data from a driver 212n into a driver message. The communication module 226, in certain embodiments, buffers the data from the driver 212n and then combines 504 the buffered data in a driver message. The driver message comprises a demand for encryption data from an encryption module 218. The communication module 226 then relays 506 the driver message to an encryption module 218.

Next, the communication module 226 packages 508 an encryption message from the encryption module 218 into a group of units. Each unit of the group of units is no larger than the maximum size of message that the driver 212n can receive. Then, the communication module 226 relays 510 the group of units to the driver 212n. The driver 212n combines 512 the group of units into a complete message, and the method 500 ends 514.

Figure 6A:
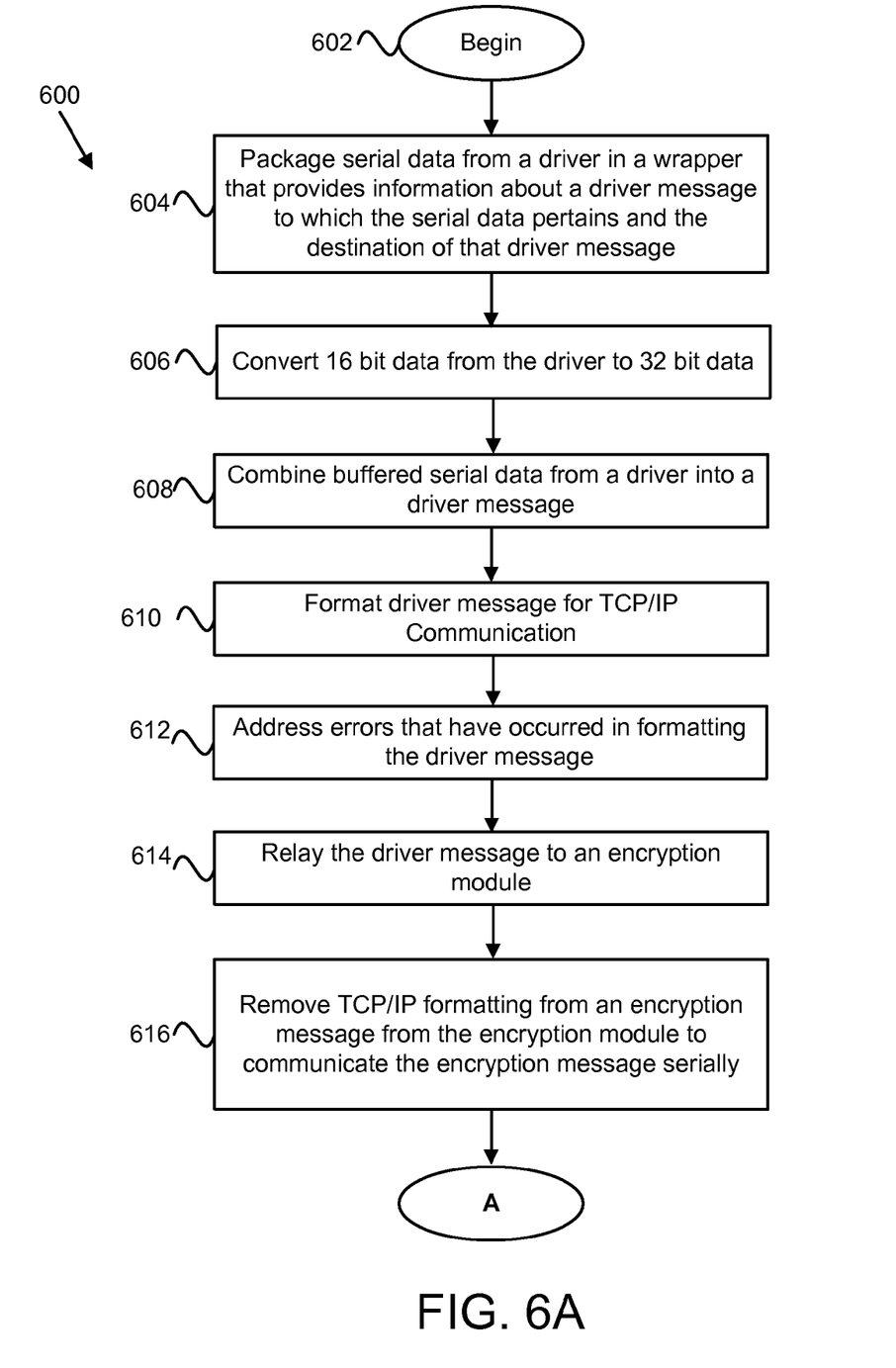
FIGS. 6A and 6B are a schematic flow chart diagram illustrating one embodiment of a method for communicating between an encryption module and a driver, with additional steps for translation and error correction, in accordance with the present invention.
Figure 6B:
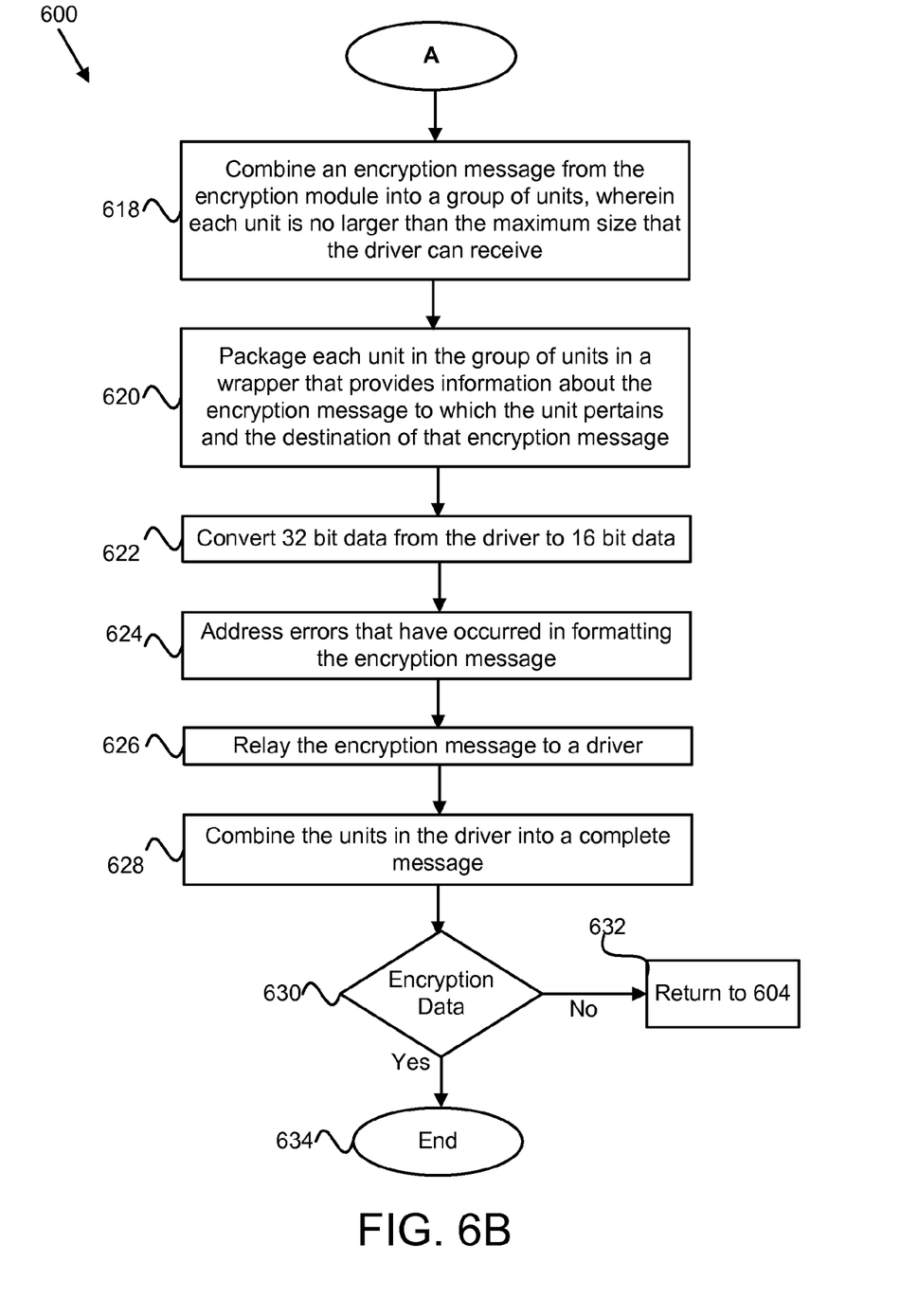

FIGS. 6A and 6B are a schematic flow chart diagram illustrating one embodiment of a method 600 for communicating between an encryption module and a driver, with additional steps for translation and error correction, in accordance with the present invention. The method 600 begins 602 and the communication module 326 packages 604 serial data from a driver 212n in a wrapper. In certain embodiments, the wrapper contains information about a message to which the serial data belongs and the destination of that message.

The method 600 continues and a bit conversion module 380 converts 606 the 16 bit serial data from the driver 212n to 32 bit data. The bit conversion module 380 performs the conversion 606 on the serial data while it remains in wrappers. A driver message module 330 then combines 608 the serial data into a driver message, in certain embodiments, with message identification information in the wrappers, keeping the wrappers intact in the process. A TCP/IP module 350 formats 610 the driver message with TCP/IP formatting.

Then, a error correction module 390 addresses 612 any errors in the driver message that may have arisen during the first four steps 604, 608, 610, 612 of the method 600 or that may have been inherent in the serial data. The communication module 326 then relays 614 the driver message to an encryption module 318. In certain embodiments, the communication module 326 relays 614 the driver message with destination information in the wrappers associated with the driver message, which the communication module 326 removes.

The encryption module 318 responds with its own message data. A serial translation module 360 removes 616 TCP/IP formatting from an encryption message originating in the encryption module 318. An encryption message module 340 packages 618 an encryption message into a group of units. Each unit of the group of units is no larger than the maximum size of message that the driver 212n can receive. Then the wrapper module 370 packages 620 each unit in the group of units in a wrapper. In certain embodiments, the wrapper contains information about a message to which the unit belongs and the destination of that message.

The bit conversion module 380 converts 32 bit data 622 in each unit, without removing the wrapper, into 16 bit data. The error correction module 390 addresses 624 errors in the group of units that may have arisen during steps seven through ten 616, 618, 620, 622 of the method 600, or that may have been inherent in the encryption message. The communication module 326 relays 626 the group of units to the driver 212n. In certain embodiments, the communication module 326 uses destination information in the wrappers associated with each unit of the group of units. In embodiments involving multiple drivers 212a-212n, the communication module 326 uses the destination information to determine which driver 212n of the multiple drivers 212a-212n is the destination of the group of units. In certain embodiments, the communication module 326 removes the wrappers from the group of units.

The driver 212n combines 628 the group of units into a complete message. In certain embodiments, the driver 212n removes the wrappers from each unit in the group of units as part of combining the group of units into a complete message. The driver 212n then determines 630 if the complete message provides encryption data or a request for additional information. If the complete message does not provide encryption data, the method 600 starts over 632 again at the first step 604 and the communication module 326 packages 604 serial data from the driver 212n in a wrapper, where the serial data provides a response to the inquiry from the encryption module 318. If the complete message does provide encryption data, the method 600 ends 634.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
at least one driver of an automated tape library, the at least one drive communicating an encryption key request as serial data with a size smaller than a maximum size;
an encryption module that provides encryption data and communicates using encryption messages comprising encryption keys no smaller than the maximum size; and
a communication module that converts the encryption key request serial data from 16-bit data to 32-bit data, combines the serial data from the at least one driver into a driver message of at least the maximum size with a wrapper providing information about driver encryption message and a destination for the driver, relays the driver message to the encryption module, divides an encryption message from the encryption module comprising a encryption key formatted as 32-bit data from the encryption module into a plurality of units each with a wrapper providing information about the encryption message and a destination of the encryption message, wherein each unit is smaller than the maximum size, converts the encryption key 32-bit data of each unit into encryption key 16-bit data and corrects errors in the encryption key 16-bit data, relays the plurality of units to the at least one driver, removes the wrapper from each unit, and combines the plurality of units within the driver to form the encryption key formatted as 16-bit data.

2. The apparatus of claim 1, wherein the communication module includes a buffer module that buffers data sent from the at least one driver and buffers data sent from the encryption module.

3. The apparatus of claim 2, wherein the communication module includes a TCP/IP module that translates serial data from the at least one driver to communicate with the encryption module in Transmission Control Protocol/Internet Protocol (TCP/IP) and a serial translation module that translates from TCP/IP to serial data to communicate with the at least one driver.

4. The apparatus of claim 3, wherein the driver message comprises a demand for encryption data, at least one follow-up inquiry by the encryption module, at least one reply by the at least one driver, and at least one set of encryption data.

5. The apparatus of claim 4, wherein the encryption module includes a plurality of encryption key managers and wherein the at least one set of encryption data is an encryption key.

6. The apparatus of claim 5, wherein the communication module includes an error correction module that corrects errors in the messages sent between the at least one driver and the encryption module.

7. A system comprising:
an automated tape library used to store electronic data;
a plurality of drivers attached to devices in the automated tape library, the plurality of drivers communicating an encryption key request as serial data with a size smaller than a maximum size;
an encryption module that provides encryption data to encrypt the electronic data stored by the automated tape library and communicates using encryption messages comprising encryption keys no smaller than the maximum; and
a communication module that converts the encryption key request serial data from 16-bit data to 32-bit data, combines the serial data from the at the plurality of drivers into a driver message of at least the maximum size with a wrapper providing information about driver encryption message and a destination for the driver, relays the driver message to the encryption module, divides an encryption message from the encryption module comprising a encryption key formatted as 32-bit data from the encryption module into a plurality of units each with a wrapper providing information about the encryption message and a destination of the encryption message, wherein each unit is smaller than the maximum size, converts the encryption key 32-bit data of each unit into encryption key 16-bit data and corrects errors in the encryption key 16-bit data, relays the plurality of units to the plurality of drivers, removes the wrapper from each unit, and combines the plurality of units within the driver to form the encryption key formatted as 16-bit data.

8. The system of claim 7, wherein the encryption module communicates with the communication module in Transmission Control Protocol/Internet Protocol (TCP/IP) and the communication module includes a TCP/IP module that translates messages in serial format to TCP/IP format and includes a serial translation module that translates messages in TCP/IP format to the serial format.

9. The system of claim 8, wherein the encryption module includes a plurality of encryption key managers that provide encryption keys.

10. A method for communicating between an encryption module and a driver, the method comprising:
communicating an encryption key request of at least one driver of an automated tape library as serial data with a size smaller than a maximum size;
converting the encryption key request serial data from 16-bit data to 32-bit data, combines the serial data from the at least one driver into a driver message of at least the maximum size with a wrapper providing information about driver encryption message and a destination for the driver;
relaying the driver message to an encryption module;
providing encryption keys formatted 32-bit data and no smaller than the maximum size as an encryption message from the encryption module;
dividing the encryption message into a plurality of units each with a wrapper providing information about the encryption message and a destination of the encryption message, wherein each unit is smaller than the maximum size;
converting the encryption key 32-bit data of each unit into encryption key 16-bit data;
correcting errors in the encryption key 16-bit data;
relaying the plurality of units to the at least one driver;
removing the wrapper from each unit; and
combining the plurality of units within the driver to form the encryption key formatted as 16-bit data.

* * * * *